(12) United States Patent
Klesyk

(10) Patent No.: US 9,778,071 B2
(45) Date of Patent: Oct. 3, 2017

(54) EXCITATION SIGNAL GENERATOR FOR RESOLVER

(71) Applicant: Lear Corporation, Southfield, MI (US)

(72) Inventor: Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 329 days.

(21) Appl. No.: 14/684,486

(22) Filed: Apr. 13, 2015

(65) Prior Publication Data

US 2015/0362338 A1    Dec. 17, 2015

Related U.S. Application Data

(60) Provisional application No. 62/011,118, filed on Jun. 12, 2014.

(51) Int. Cl.
 *G01D 5/20*  (2006.01)
(52) U.S. Cl.
 CPC ............ *G01D 5/20* (2013.01); *G01D 5/2073* (2013.01)
(58) Field of Classification Search
 CPC ............................... G01D 5/20; G01D 5/2073
 USPC ..................................... 318/400.39
 See application file for complete search history.

(56) References Cited

U.S. PATENT DOCUMENTS

| | | | | |
|---|---|---|---|---|
| 4,442,696 A | * | 4/1984 | Erickson | G01B 11/2755 33/203 |
| 5,164,720 A | * | 11/1992 | Morser | G08C 19/46 318/653 |
| 8,471,506 B2 | | 6/2013 | Manabe | |
| 8,606,447 B2 | | 12/2013 | Namuduri et al. | |
| 2005/0200367 A1 | * | 9/2005 | Khaykin | G01D 5/2046 324/654 |
| 2007/0216324 A1 | * | 9/2007 | Liu | G01D 5/2093 318/400.39 |
| 2011/0140689 A1 | * | 6/2011 | Fernando | G01B 7/30 324/207.25 |
| 2012/0087053 A1 | * | 4/2012 | Mizui | H02H 9/025 361/93.7 |
| 2013/0134915 A1 | | 5/2013 | Chung et al. | |
| 2013/0187582 A1 | | 7/2013 | Nishimura et al. | |

(Continued)

FOREIGN PATENT DOCUMENTS

| JP | 2001082980 A | * | 3/2001 |
|---|---|---|---|
| JP | 2015010930 A | * | 1/2015 |
| WO | 2013031166 A1 | | 2/2014 |

OTHER PUBLICATIONS

Semiconductor Components Industries, LLC, Adjustable Constant Current Regulator & LED Driver, Publication Order No. NSI45090JDT4G, ON Semiconductor—Registered Trademark, Apr. 2014, Rev. 3.

(Continued)

*Primary Examiner* — Kawing Chan
(74) *Attorney, Agent, or Firm* — Brooks Kushman P.C.

(57) ABSTRACT

A resolver excitation signal generator includes a source configured to generate a sinusoidal input signal and an inverting amplifier circuit. The inverting amplifier circuit has an input connected to the source to receive the sinusoidal input signal and an output lacking a transistor stage. The inverting amplifier circuit is configured to amplify the sinusoidal input signal to generate at the output of the inverting amplifier circuit an excitation signal in the form of an amplified version of the sinusoidal input signal for a resolver.

12 Claims, 4 Drawing Sheets

(56) References Cited

U.S. PATENT DOCUMENTS

2013/0249453 A1    9/2013  Ura
2013/0257411 A1   10/2013  Oowada
2014/0361792 A1*  12/2014  Nakamura ........... G01D 5/2073
                                                         324/655

OTHER PUBLICATIONS

Semiconductor Components Industries, LLC, 1.0 A Output Current, Dual Power Operation Amplifiers, Publication No. TCA0372, TCA0372B, Jul. 2005, Rev. 9.
Analog Devices, Inc., 12-Bit RDC with Reference Oscillator, ADS2S1205, www.analog.com, Copyright 2007-2010.

* cited by examiner (Background)

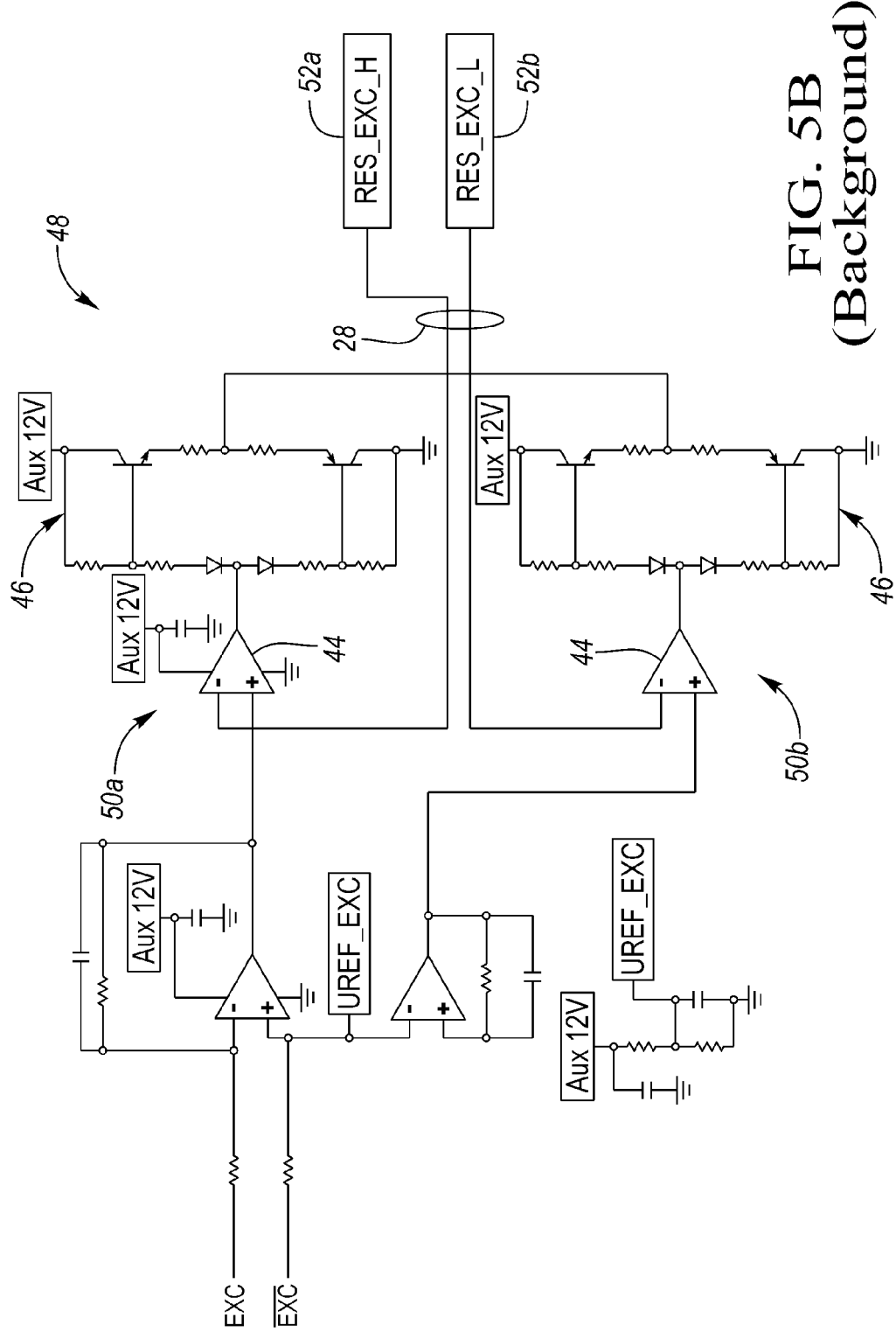
FIG. 5B (Background)

EXCITATION SIGNAL GENERATOR FOR RESOLVER

CROSS-REFERENCE TO RELATED APPLICATIONS

This application claims the benefit of U.S. Provisional Application No. 62/011,118, filed Jun. 12, 2014, the disclosure of which is hereby incorporated in its entirety by reference herein.

TECHNICAL FIELD

The present invention relates to generating an excitation signal for a resolver.

BACKGROUND

A position sensor such as a resolver is configured to monitor the rotational angular position of a rotating device, such as a rotating electrical machine like a motor. The resolver outputs a signal output (resolver output) corresponding to the motor angular position. A resolver to digital (R2D) converter converts the resolver output into the motor angular position. A controller uses the motor angular position to control the motor.

The resolver generates the resolver output from an excitation signal provided to the resolver. The resolver modulates the excitation signal according to the motor angular position to generate the resolver output. An excitation signal generator provides the excitation signal to the resolver. The excitation signal generator should be implemented economically.

SUMMARY

A method for a resolver includes amplifying a sinusoidal input signal using an inverting amplifier circuit, the inverting amplifier circuit lacking a transistor stage at an output of the inverting amplifier circuit, to generate at the output of the inverting amplifier circuit an excitation signal. The method further includes providing the excitation signal at the output of the inverting amplifier circuit to a resolver.

The method may further include amplifying a complement of the sinusoidal input signal using a second inverting amplifier circuit, the second inverting amplifier circuit lacking a transistor stage at an output of the second inverting amplifier circuit, to generate at the output of the second inverting amplifier circuit an additional excitation signal component. In this case, the method further includes providing the additional excitation signal component at the output of the second inverting amplifier circuit to the resolver.

The method may further include providing operating power to the inverting amplifier circuit using an adjustable current driver.

A resolver excitation signal generator includes a source configured to generate a sinusoidal input signal and an amplifier circuit. The amplifier circuit includes an input connected to the source to receive the sinusoidal input signal and an output lacking a transistor stage. The amplifier circuit is configured to amplify the sinusoidal input signal to generate at the output of the amplifier circuit an excitation signal in a form of an amplified version of the sinusoidal input signal for a resolver.

The amplifier circuit may be an inverting amplifier circuit. The inverting amplifier circuit may include an amplifier and an adjustable gain feedback loop. A negative input terminal of the amplifier receives the sinusoidal input signal and receives the excitation signal through the feedback loop. A positive input terminal of the amplifier receives a reference voltage.

The source may be configured to generate a complement of the sinusoidal input signal. In this case, the generator further includes a second inverting amplifier circuit having an input connected to the source to receive the complement of the sinusoidal input signal and an output lacking a transistor stage. The second inverting amplifier circuit is configured to amplify the complement of the sinusoidal input signal to generate at an output of the second inverting amplifier circuit an additional excitation signal component in a form of an amplified version of the complement of the sinusoidal input signal for the resolver.

The second inverting amplifier circuit includes a second amplifier and a second adjustable gain feedback loop. A negative input terminal of the second amplifier receives the complement of the sinusoidal input signal and receives the additional excitation signal component through the second feedback loop.

The generator may further include an adjustable current driver configured to provide a regulated operating power to the amplifier of each inverting amplifier circuit.

The amplifiers of the inverting amplifier circuits may be part of a TCA0372 Operational Amplifier electronic chip.

The adjustable current driver may be a NSI45090JDT4G adjustable constant current regulator.

A resolver system for detecting angular position of a motor includes a resolver, an input signal source, and an inverting amplifier circuit. The resolver is configured to use an excitation signal provided to the resolver to generate resolver output signals indicative of angular position of a motor. The inverting amplifier circuit has an input connected to the source to receive the input signal and an output lacking a transistor stage. The inverting amplifier circuit is configured to amplify the input signal to generate at the output of the inverting amplifier circuit an excitation signal component in a form of an amplified version of the input signal. The resolver is connected to the output of the inverting amplifier circuit to receive the excitation signal component.

BRIEF DESCRIPTION OF THE DRAWINGS

FIG. 5B illustrates a highly detailed electrical schematic of exemplary amplifier circuitry including buffer circuitry connected between the excitation signal generator of the R2D converter assembly and the resolver.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
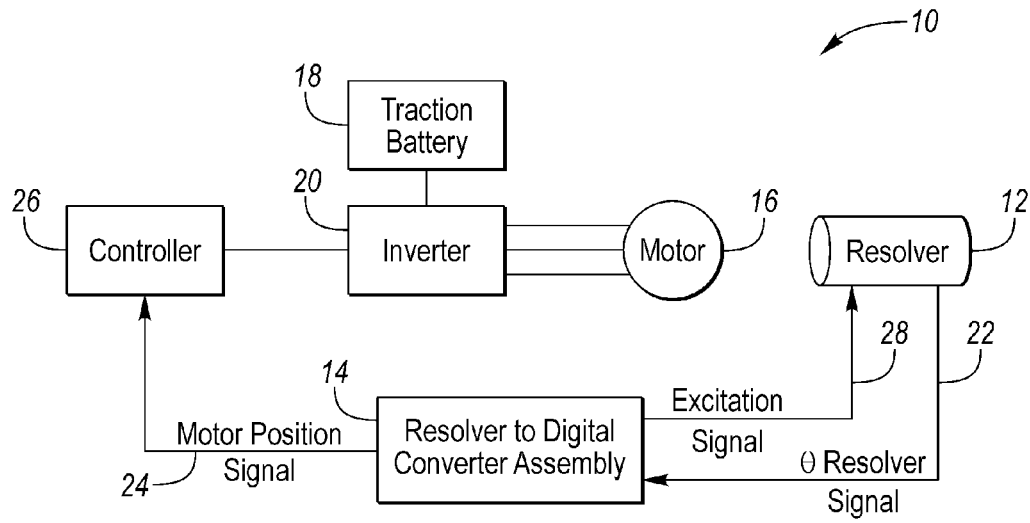
FIG. 1 illustrates a block diagram of an exemplary electric vehicle powertrain having a resolver and a resolver to digital (R2D) converter assembly in accordance with an embodiment of the present invention.

Referring now to FIG. 1, a block diagram of an exemplary electric vehicle powertrain 10 having a resolver 12 and a resolver to digital (R2D) converter assembly 14 in accordance with an embodiment of the present invention is shown. Powertrain 10 is, for example, the powertrain of a hybrid or plug-in hybrid electric vehicle in which case the powertrain further includes an engine or the powertrain of a battery electric vehicle in which case the powertrain lacks an engine. Powertrain 10 includes an AC electric motor 16 configured to produce a motor torque for vehicle propulsion. The motor torque is transferred to the vehicle drive wheels (not shown) to propel the vehicle. A (high-voltage) traction battery 18 supplies electrical energy to motor 16 via an inverter 20 for the motor to produce the motor torque. The electrical energy supplied from battery 18 is high-voltage DC electrical energy. Inverter 20 inverts the DC electrical energy into AC electrical energy for receipt by motor 16. The AC electrical energy provided from inverter 20 to motor 16 is a frequency controlled, three-phase AC signal, for example.

Resolver 12 is a position sensor configured to monitor the rotational angular position of motor 16. Resolver 12 outputs a signal output (resolver output 22) corresponding to the motor angular position. R2D converter assembly 14 converts resolver output 22 into a motor position signal 24 indicative of the motor angular position. A controller (e.g., a micro-controller) ("controller") 26 uses the motor angular position to control motor 16 by controlling inverter 20 correspondingly. The functionality provided by R2D converter assembly 14 can be performed by controller 26 in which case R2D converter assembly 14 would effectively be incorporated into the controller.

Resolver 12 generates resolver output 22 from an excitation signal 28. R2D converter assembly 14 generates and provides excitation signal 28 to resolver 12. Resolver 12 modulates excitation signal 28 according to the motor angular position to generate resolver output 22 indicative of the motor angular position.

Figure 2:
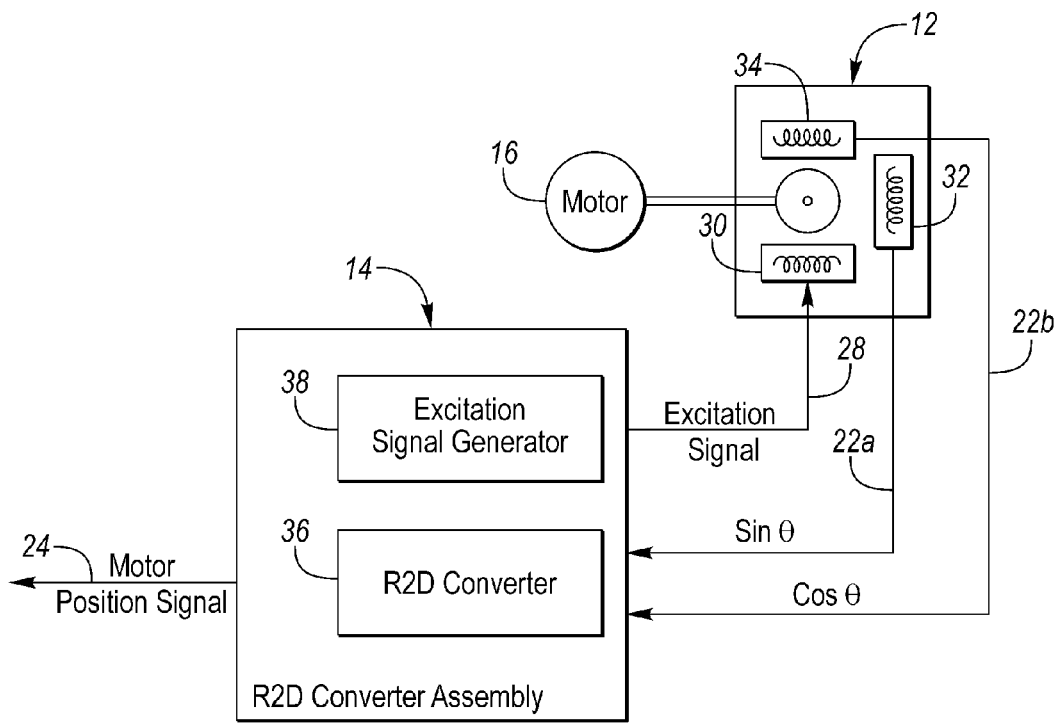
FIG. 2 illustrates a block diagram of the resolver and the R2D converter assembly in greater detail.

Referring now to FIG. 2, with continual reference to FIG. 1, a block diagram of resolver 12 and R2D converter assembly 14 in greater detail is shown. Resolver 12 is a rotatable transformer having a rotor and a stator. The rotor is mechanically coupled to the rotor shaft of motor 16. The rotor thereby rotates relative to the stator as the rotor shaft of motor 16 rotates. The rotor includes a primary winding 30 thereon and the stator includes first and second secondary windings 32 and 34 thereon. Secondary windings 32 and 34 are displaced mechanically by 90° with respect to one another as shown in FIG. 2.

R2D converter assembly 14 provides an alternating current (AC) excitation signal 28 to primary winding 30 of resolver 12. Excitation signal 28 excites primary winding 30. Magnet flux generated in primary winding 30 as a result of excitation signal 28 couples with secondary windings 32 and 34. The amplitude of coupling onto secondary windings 32 and 34 is a function of the position of the rotor (i.e., the angle $\theta$ of the rotor shaft of motor 16) relative to the stator. Secondary windings 32 and 34 therefore produce first and second resolver output signals 22a and 22b, respectively, modulated by the sine and cosine of the rotor shaft angle $\theta$.

R2D converter assembly 14 includes an R2D converter 36 and an excitation signal generator 38. R2D converter 36 processes resolver signals 22a and 22b to generate therefrom motor position signal 24 indicative of the motor angular position as detected by resolver 12. Excitation signal generator 38 is configured to generate and provide excitation signal 28 to primary winding 30 of resolver 12.

Figure 3:
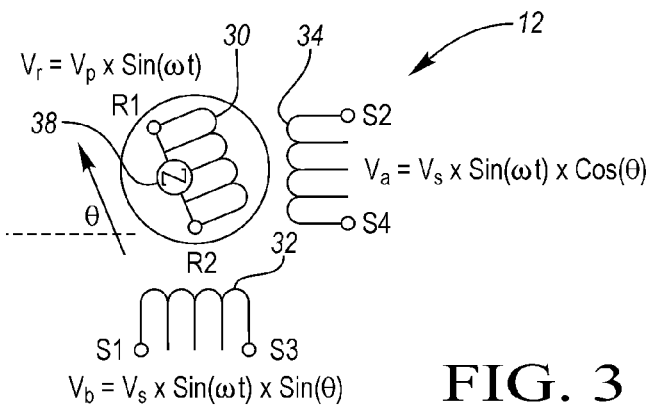
FIG. 3 illustrates a circuit diagram of the resolver in greater detail.

Referring now to FIG. 3, with continual reference FIG. 2, a circuit diagram of resolver 12 in greater detail is shown. Again, resolver 12 includes a rotor with primary winding 30 and a stator with secondary windings 32 and 34. Excitation signal 28 received by primary winding 30 (i.e., voltage R2-R1 input to primary winding 30) has the form of $V_p \cdot \sin(\omega t)$, where $V_p$ and $\sin(\omega t)$ are the amplitude and frequency of the excitation signal, respectively. Resolver signal 22a generated by secondary winding 32 (i.e., voltage S3-S1 output from secondary winding 32) has the form of $V_s \cdot \sin(\omega t) \cdot \sin(\theta)$, where $V_s$ is the amplitude of the resolver output signal 22 and $\theta$ is the rotor shaft angle. Resolver signal 22b generated by secondary winding 34 (i.e., voltage S4-S2 output from secondary winding 34) has the form of $V_s \cdot \sin(\omega t) \cdot \cos(\theta)$. As such, in response to an excitation signal 28 (e.g., $\sin(\omega t)$) being inputted to primary winding 30, resolver signal 22a ($\sin(\omega t) \cdot \sin(\theta)$) and resolver signal 22b ($\sin(\omega t) \cdot \cos(\theta)$) modulated according to the rotor shaft angle $\theta$ are generated by secondary windings 32 and 34, respectively, with a phase difference of 90°.

As described, excitation signal generator 38 provides excitation signal 28 to primary winding 30. Excitation signal generator 38 is, for example, a sine wave generator having an oscillator or the like to generate excitation signal 28. R2D converter 36 receives and demodulates resolver signals 22a and 22b to produce motor position signal 24 indicative of the motor angular position.

Figure 4:
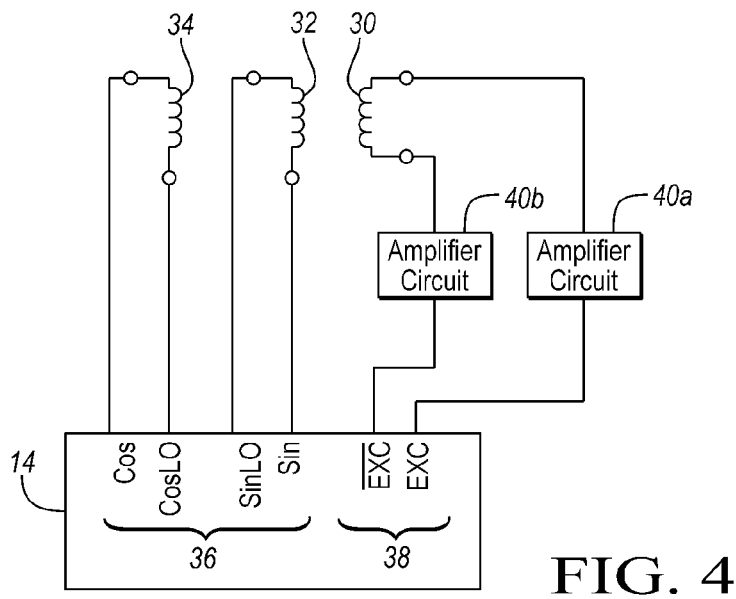
FIG. 4 illustrates a circuit diagram of the resolver connected to the R2D converter assembly in accordance with an embodiment of the present invention.

Referring now to FIG. 4, with continual reference to FIG. 3, a circuit diagram of resolver 12 connected to R2D converter assembly 14 in accordance with an embodiment of the present invention is shown. R2D converter assembly 14 is in the form of, for example, an AD2S1205 electronic chip. As known to those of ordinary skill in the art, the AD2S1205 chip includes R2D converter 36 and excitation signal generator 38 (i.e., an on-board programmable sinusoidal oscillator).

R2D converter 36 includes a first pair of input pins including Sin pin #37 and Sin LO pin #38 and a second pair of input pins including Cos LO pin #40 and Cos pin #41. Input pins #37 and #38 are connected to respective ends of secondary winding 32 of resolver 12 to receive resolver signal 22a. Likewise, input pins #40 and #41 are connected to respective ends of secondary winding 34 of resolver 12 to receive resolver signal 22b.

Excitation signal generator 38 includes EXC output pin #34 (excitation frequency) and $\overline{EXC}$ output pin #35 (excitation frequency complement). Excitation signal generator 38 provides a sinusoidal excitation signal (EXC) from EXC output pin #34 and its complement signal ($\overline{EXC}$) from $\overline{EXC}$ output pin #35 to respective ends of primary winding 30 of resolver 12. The combination of the excitation signal (EXC) and the complement signal ($\overline{EXC}$) form excitation signal 28.

The oscillator of excitation signal generator 38 is programmable to generate the excitation (reference) signal with a frequency of 10 kHz, 12 kHz, 15 kHz, or 20 kHz.

The excitation signal (EXC) and its complement signal ($\overline{EXC}$) output from excitation signal generator 38 (in the form of AD2S1205 electronic chip) is to be amplified in order to drive primary winding 30 with an adequate excitation signal 28. Accordingly, the arrangement shown in FIG. 4 further includes external amplifier circuitry connected between excitation signal generator 38 and resolver 12. The amplifier circuitry provides gain and additional current to drive resolver 12. The amplifier circuitry includes a first amplifier circuit 40a and a second amplifier circuit 40b. First amplifier circuit 40a is connected between EXC output pin #34 and the corresponding end of primary winding 30. Second amplifier circuit 40b is connected between $\overline{EXC}$ output pin #35 and the other end of primary winding 30. First amplifier circuit 40a amplifies the excitation signal (EXC) from EXC output pin #34 and provides the amplified excitation signal (EXC) to resolver 12. Likewise, second amplifier circuit 40b amplifies the complement excitation signal ($\overline{EXC}$) from $\overline{EXC}$ output pin #35 and provides the amplified complement excitation signal ($\overline{EXC}$) to resolver 12.

Figure 5A:
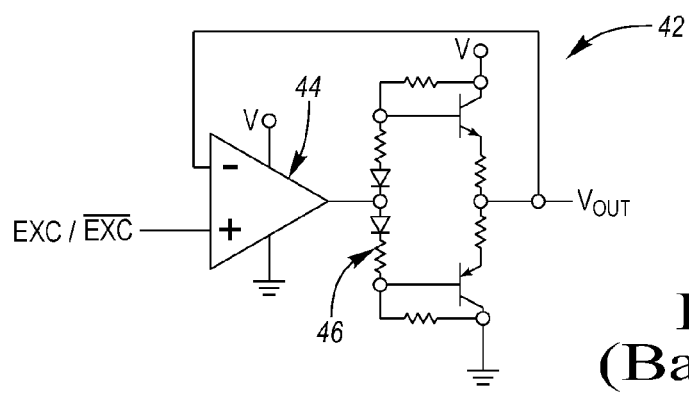
FIG. 5A illustrates a circuit diagram of an exemplary amplifier circuit in the form of a buffer circuit connected between an excitation signal generator of the R2D converter assembly and the resolver.

Referring now FIG. 5A, a circuit diagram of an exemplary amplifier circuit 42 connected between excitation signal generator 38 of R2D converter assembly 14 and resolver 12 is shown. With reference to FIG. 4, one amplifier circuit 42 in place of amplifier circuit 40a is connected between EXC output pin #34 and the corresponding end of primary winding 30. Similarly, another amplifier circuit 42 in place of amplifier circuit 40b is connected between $\overline{EXC}$ output pin #35 and the other end of primary winding 30. Amplifier circuit 42 is the form of a buffer circuit configured to output an input voltage with additional current and includes an amplifier 44 and a complementary bipolar transistor stage 46. Amplifier 44 amplifies an input voltage (e.g., the excitation signal (EXC)) to produce an output which is routed through complementary bipolar transistor stage 46 to generate the output voltage (e.g., the amplified excitation signal (EXC)). The "+" terminal of amplifier 44 is connected to the input voltage and the output voltage is connected in a feedback loop to the "−" terminal of amplifier 44. One concern with amplifier circuit 42 is the relatively large amount of discrete components for implementing complementary bipolar transistor stage 46.

Referring now to FIG. 5B, with continual reference to FIGS. 4 and 5A, a highly detailed electrical schematic of exemplary amplifier circuit arrangement 48 connected between excitation signal generator 38 of R2D converter assembly 14 and resolver 12 is shown. Amplifier circuit arrangement 48 amplifies the excitation/complement input signals (EXC/$\overline{EXC}$) from excitation signal generator 38 to generate excitation signal 28. In particular, a first portion 50a of amplifier circuit 48 amplifies the excitation signal (EXC) to generate an amplified excitation signal (RES_EXC_H) 52a and a second portion 50b of amplifier circuit 48 amplifies the complement excitation signal ($\overline{EXC}$) to generate an amplified excitation signal (RES_EXC_L) 52b. The combination of amplified excitation signals 52a and 52b output from amplifier circuit arrangement 48 form excitation signal 28.

With reference to FIG. 5A, first and second portions 50a and 50b of amplifier circuit arrangement 48 each include an amplifier circuit in the form of a buffer circuit including an amplifier 44 and a complementary bipolar transistor stage 46. Amplifier circuit arrangement 48 is characterized by having a discrete circuit implementation due to the presence of complementary bipolar transistor stage 46. In general, amplifier circuit arrangement 48 generally has the following shortcomings: a relatively large amount of discrete components are utilized; not protected for shorts; no thermal protection; damaged supply powering the circuit when a short circuit condition is present; all functions on this supply are disabled when shorted; and susceptible to noise.

Figure 6:
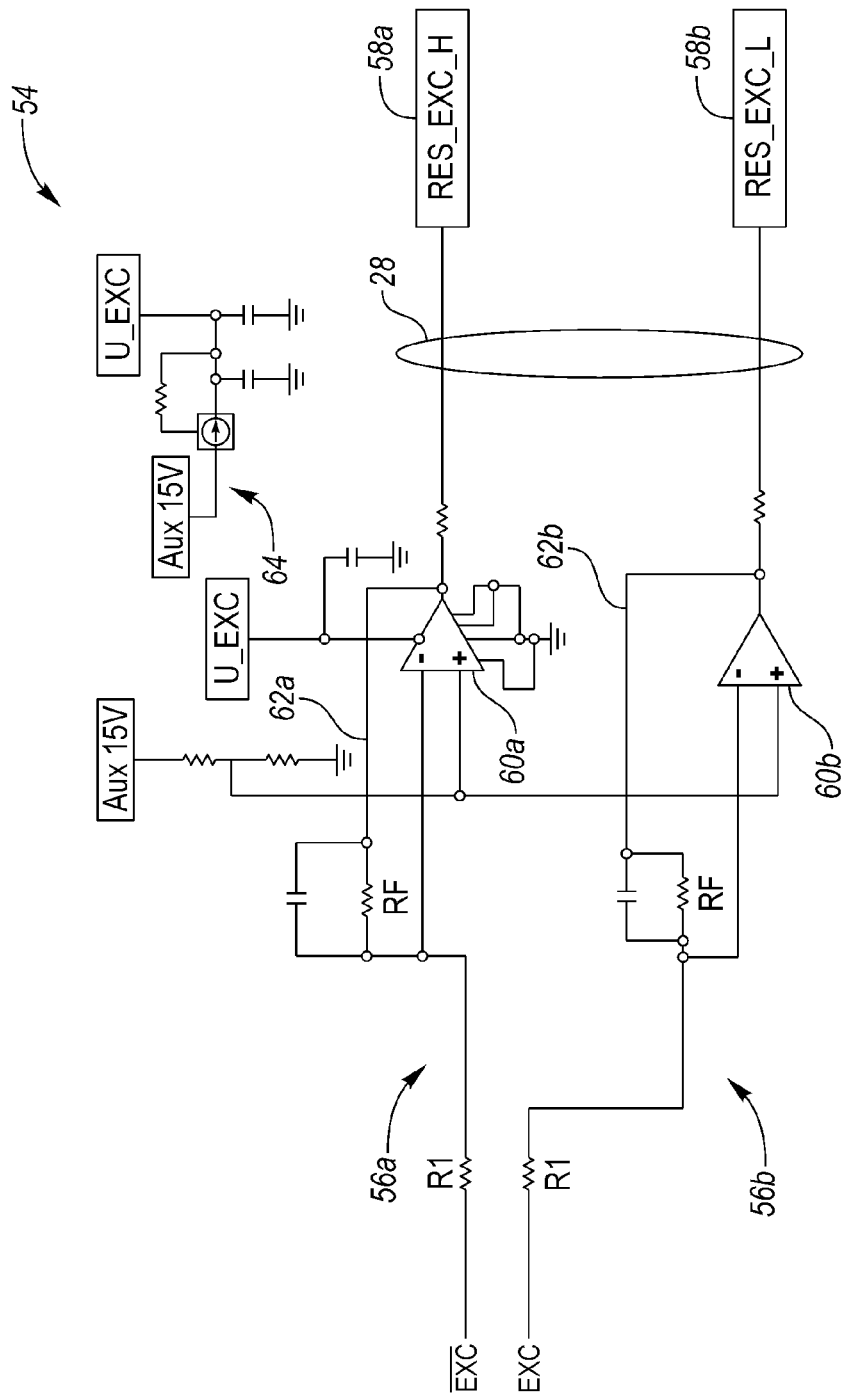
FIG. 6 illustrates a highly detailed electrical schematic of amplifier circuitry connected between the excitation signal generator of the R2D converter assembly and the resolver in accordance with an embodiment of the present invention.

Referring now to FIG. 6, a highly detailed electrical schematic of amplifier circuitry 54 connected between excitation signal generator 38 of R2D converter assembly 14 and resolver 12 in accordance with an embodiment of the present invention is shown. Again, in this embodiment, R2D converter assembly 14 is in the form of an AD2S1205 electronic chip. In particular, R2D converter assembly 14 is in the form of an ADW71205WSTZ electronic chip. Amplifier circuitry 54 amplifies the excitation/complement input signals (EXC/$\overline{EXC}$) from excitation signal generator 38 to generate excitation signal 28. In particular, a first amplifier portion 56a amplifies the input complement excitation signal ($\overline{EXC}$) to generate an amplified excitation signal (RES_EXC_H) 58a and a second amplifier portion 56b amplifies the input excitation signal (EXC) to generate an amplified excitation signal (RES_EXC_L) 58b. The combination of amplified excitation signals 52a and 52b output from amplifier circuit arrangement 54 form excitation signal 28.

First amplifier portion 56a functions as an inverting amplifier as the amplified excitation signal (RES_EXC_H) 58a is generated from the inputted complement excitation signal ($\overline{EXC}$). Likewise, second amplifier portion 56b functions as an inverting amplifier as amplified excitation signal (RES_EXC_L) 58b is generated from the inputted excitation signal (EXC). In this regard, first and second amplifier portions 56a and 56b each include an inverting amplifier stage. The inverting amplifier stage of first amplifier portion 56a includes an amplifier 60a and an adjustable gain (−1*(Rf/R1)) feedback loop 62a. The "−" terminal of amplifier 60a is connected to the input complement excitation signal ($\overline{EXC}$) and is connected to the outputted amplified excitation signal (RES_EXC_H) 58a through feedback loop 62a. The "+" terminal of amplifier 60a is connected to a voltage reference. Similarly, the inverting amplifier stage of second amplifier portion 56b includes an amplifier 60b and an adjustable gain (−1*(Rf/R1)) feedback loop 62b. The "−" terminal of amplifier 60b is connected to the inputted excitation signal (EXC) and is connected to the outputted amplified excitation signal (RES_EXC_L) 58b through feedback loop 62b. The "+" terminal of amplifier 60b is connected to a voltage reference.

Amplifier circuitry 54 is characterized by having a low-cost dual channel amplifier stage formed by first and second amplifier portions 56a and 56b. The dual channel amplifier stage includes, for example, a TCA0372 Operational Amplifier electronic chip having amplifiers 60a and 60b. The TCA0372 electronic chip has built-in thermal protection for amplifiers 60a and 60b.

Amplifier circuitry 54 is further characterized by having the dual channel amplifier stage, including amplifiers 60a and 60b, in combination with an adjustable current driver 64. Adjustable current driver 64 provides operating power to amplifiers 60a and 60b. In particular, adjustable current driver 64 provides operating power to an input operating power port of the TCA0372 electronic chip for powering amplifiers 60a and 60b. Adjustable current driver 64 includes an adjustable constant current regulator such as, for example, a NSI45090JDT4G adjustable constant current regulator. Adjustable current driver 64 is used as an integrated low cost linear current limit for the dual channel amplifier stage. In this regard, adjustable current driver 64 generates and provides a regulated operating voltage V_EXC to the dual channel amplifier stage. Adjustable current driver 64 regulates the operating voltage in that the adjustable current driver limits the operating current provided to amplifiers 60a and 60b. In particular, adjustable current driver 64 is configured to collapse the power supply to amplifiers 60a and 60b in the event of a short circuit (which is detected as a result of the increased current load). As such, amplifier circuitry 54 provides short circuit protection for amplifiers 60a and 60b. In general, adjustable current driver 64 is characterized by protecting the power supply, protecting resolver 12, decoupling remaining functions on the power supply and allowing them to fully function, and improving diagnostics.

As described and illustrated, amplifier circuitry 54 having the dual channel amplifier stage formed by first and second amplifier portions 56a and 56b in combination with adjustable current driver 64 is characterized as having integrated power stages and low noise susceptibility due to the relatively low amount of components and traces. Amplifier circuitry 54 lacks any complementary bipolar transistor stage included in typical amplifier circuitry such as shown in FIG. 5B. As a result, amplifier circuitry 54 for generating excitation signal 28 is characterized by requiring less PCB space than typical amplifier circuitry such as shown in FIG. 5B.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a resolver, comprising:
   amplifying a sinusoidal input signal using a first inverting amplifier circuit, the first inverting amplifier circuit lacking a transistor stage at an output of the first inverting amplifier circuit, to generate at the output of the first inverting amplifier circuit an excitation signal;
   providing the excitation signal at the output of the first inverting amplifier circuit to a resolver;
   amplifying a complement of the sinusoidal input signal using a second inverting amplifier circuit, the second inverting amplifier circuit lacking a transistor stage at an output of the second inverting amplifier circuit, to generate at the output of the second inverting amplifier circuit an additional excitation signal component;
   providing the additional excitation signal component at the output of the second inverting amplifier circuit to the resolver; and
   wherein the second inverting amplifier circuit includes a second amplifier and a second adjustable gain feedback loop, wherein a negative input terminal of the second amplifier receives the complement of the sinusoidal input signal and receives the additional excitation signal component through the second feedback loop.

2. The method of claim 1 wherein:
   the first inverting amplifier circuit includes a first amplifier and a first adjustable gain feedback loop, wherein a negative input terminal of the first amplifier receives the sinusoidal input signal and receives the excitation signal through the first feedback loop.

3. The method of claim 2 wherein:
   a positive input terminal of the first amplifier receives a reference voltage.

4. The method of claim 1 further comprising:
   providing operating power to the first inverting amplifier circuit using an adjustable current driver.

5. The method of claim 1 further comprising:
   connecting the output of the first inverting amplifier circuit directly to the resolver such that the excitation signal at the output of the first inverting amplifier circuit is provided directly to the resolver.

6. A resolver excitation signal generator comprising:
   a source configured to generate a sinusoidal input signal and a complement of the sinusoidal input signal;
   a first inverting amplifier circuit having an input connected to the source to receive the sinusoidal input signal and an output lacking a transistor stage, the first inverting amplifier circuit configured to amplify the sinusoidal input signal to generate at the output of the first inverting amplifier circuit an excitation signal in a form of an amplified version of the sinusoidal input signal for a resolver;
   a second inverting amplifier circuit having an input connected to the source to receive the complement of the sinusoidal input signal and an output lacking a transistor stage, the second inverting amplifier circuit configured to amplify the complement of the sinusoidal input signal to generate at an output of the second inverting amplifier circuit an additional excitation signal component in a form of an amplified version of the complement of the sinusoidal input signal for the resolver; and
   wherein the second inverting amplifier circuit includes a second amplifier and a second adjustable gain feedback loop, wherein a negative input terminal of the second amplifier receives the complement of the sinusoidal input signal and receives the additional excitation signal component through the second feedback loop.

7. The generator of claim 6 wherein:
   the first inverting amplifier circuit includes a first amplifier and a first adjustable gain feedback loop, wherein a negative input terminal of the first amplifier receives the sinusoidal input signal and receives the excitation signal through the first feedback loop.

8. The generator of claim 7 wherein:
   a positive input terminal of the first amplifier receives a reference voltage.

9. The generator of claim 7 wherein:
   the amplifiers of the inverting amplifier circuits are part of an operational amplifier electronic chip.

10. The generator of claim 6 further comprising:
    an adjustable current driver configured to provide a regulated operating power to the first inverting amplifier circuit and to the second inverting amplifier circuit.

11. The generator of claim 10 wherein:
    the adjustable current driver is an adjustable constant current regulator.

12. A resolver system for detecting angular position of a rotating machine, comprising:
    a resolver configured to use an excitation signal provided to the resolver to generate resolver output signals indicative of angular position of a rotating machine;
    a source configured to generate an input signal and a complement of the input signal;
    a first inverting amplifier circuit having an input connected to the source to receive the input signal and an output lacking a transistor stage, the first inverting amplifier circuit configured to amplify the input signal to generate at the output of the first inverting amplifier circuit a first excitation signal component in a form of an amplified version of the input signal;

a second inverting amplifier circuit having an input connected to the source to receive the complement of the input signal and an output lacking a transistor stage, the second inverting amplifier circuit configured to amplify the complement of the input signal to generate at an output of the second inverting amplifier circuit a second excitation signal component in a form of an amplified version of the complement of the input signal;

wherein the resolver is connected to the output of the first inverting amplifier circuit to receive the first excitation signal component and to the output of the second inverting amplifier circuit to receive the second excitation signal component; and wherein each inverting amplifier circuit includes an amplifier and an adjustable gain feedback loop, wherein a negative input terminal of the amplifier of the first inverting amplifier circuit receives the input signal and receives the first excitation signal component through the feedback loop of the first inverting amplifier circuit, wherein a negative terminal of the amplifier of the second inverting amplifier circuit receives the complement of the input signal and receives the second excitation signal component through the feedback loop of the second inverting amplifier circuit.

* * * * *